March 23, 1926. 1,577,928
H. P. MURRAY
TIRE BAND EXPANDING MACHINE
Filed Nov. 19, 1923 6 Sheets-Sheet 3
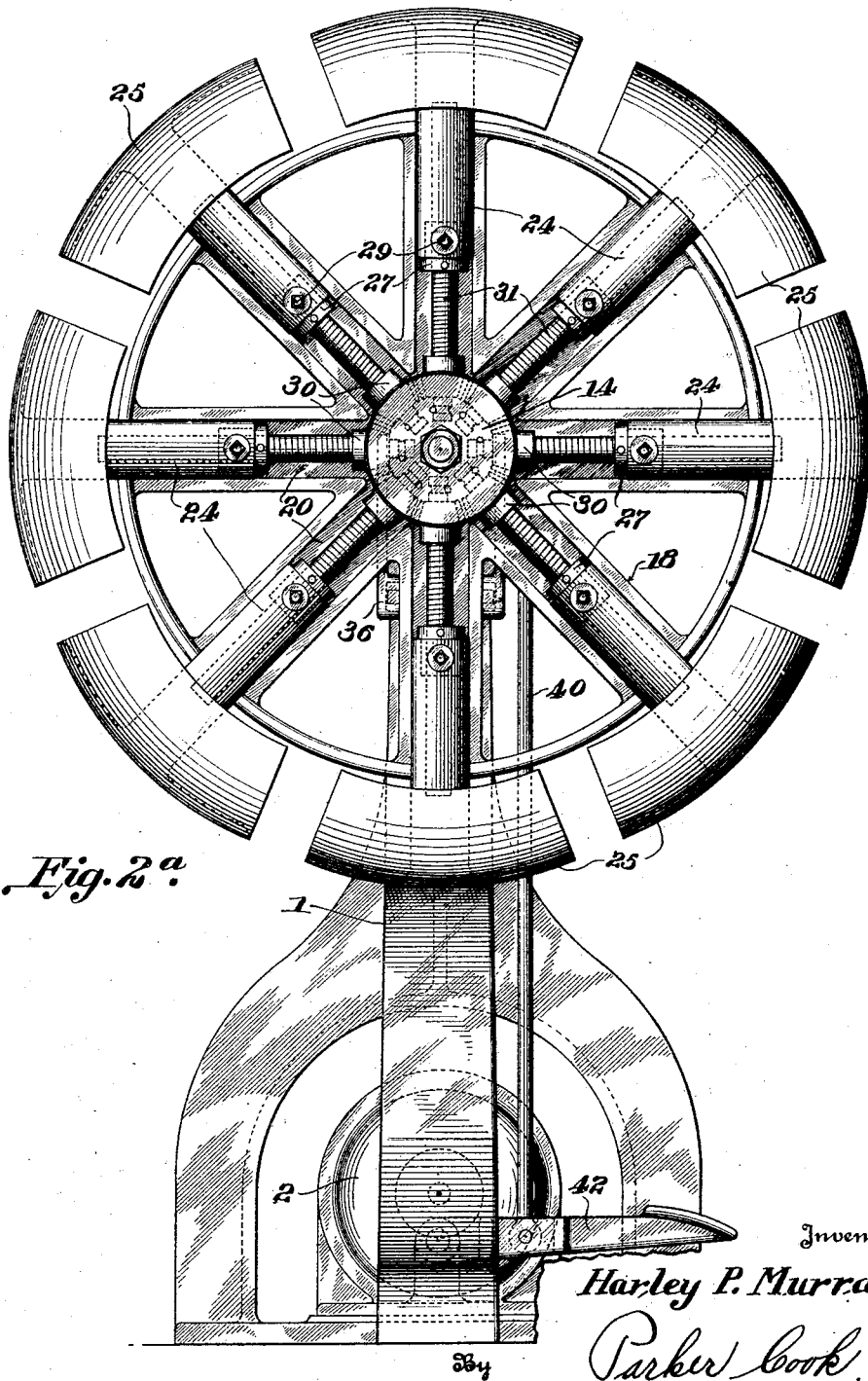
Fig. 2ª
Inventor
Harley P. Murray
By Parker Cook
Attorney

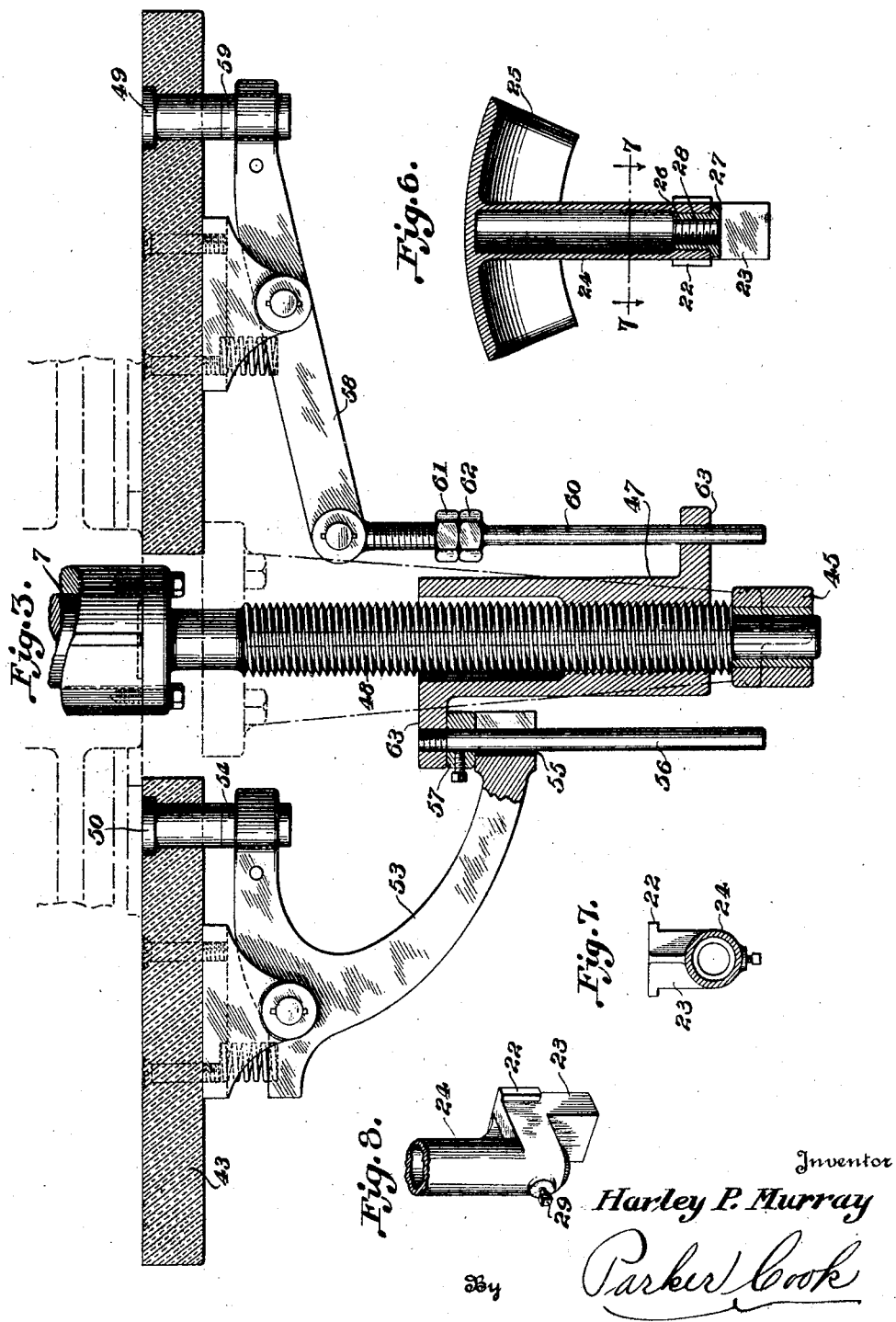

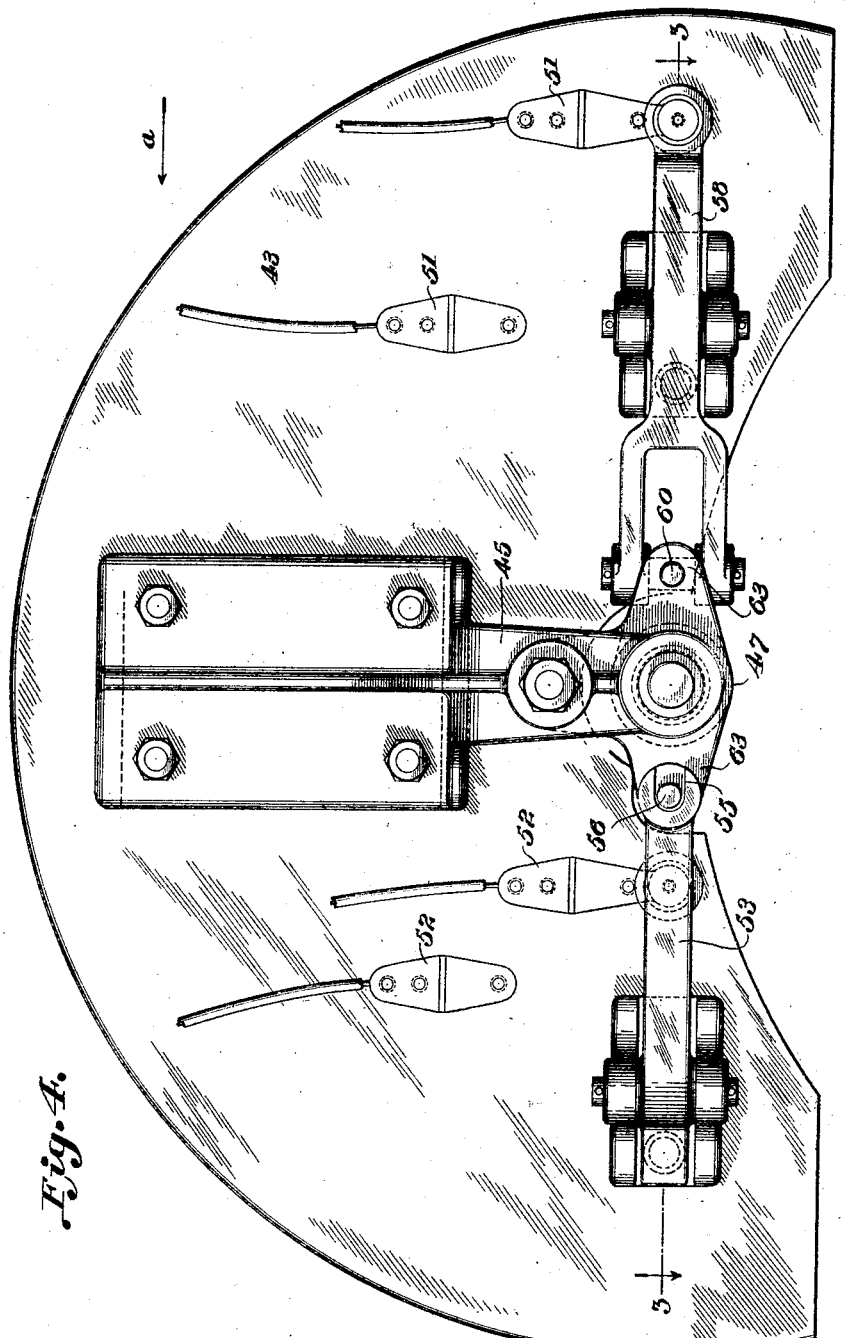

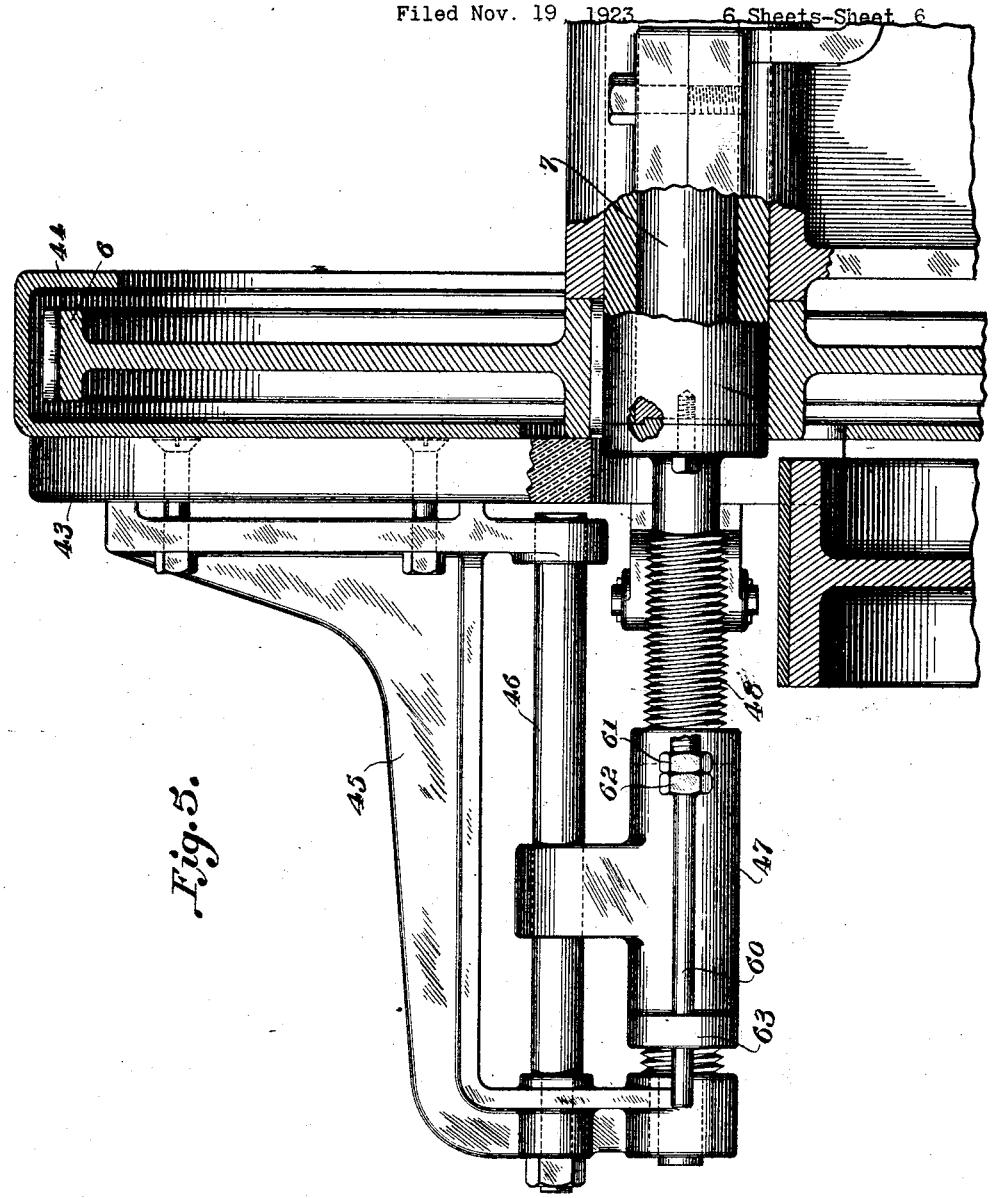

Patented Mar. 23, 1926.

1,577,928

UNITED STATES PATENT OFFICE.

HARLEY P. MURRAY, OF CONSHOHOCKEN, PENNSYLVANIA, ASSIGNOR OF ONE-HALF TO LEE TIRE & RUBBER COMPANY, OF CONSHOHOCKEN, PENNSYLVANIA, A CORPORATION OF PENNSYLVANIA.

TIRE-BAND-EXPANDING MACHINE.

Application filed November 19, 1923. Serial No. 675,610.

*To all whom it may concern:*

Be it known that I, HARLEY P. MURRAY, a citizen of the United States of America, residing at Conshohocken, in the county of Montgomery and State of Pennsylvania, have invented certain new and useful Improvements in Tire-Band-Expanding Machines, of which the following is a specification.

My invention relates to new and useful improvements in tire band expanding machines and has for an object to provide a means whereby the bands of "cord fabric" may be so stretched that no wrinkles will occur in the tire carcass when the fabric is placed upon the regular cord tire building machine.

I have found that when building the larger size tires (six inches and up), it is necessary to in some manner stretch the cord band so that the individual cords will be parallel to each other, or in other words, straighten the cords so there will be no wrinkles in the fabric when placed on the tire building machine.

It is possible to do this with cord fabric, as the cords of each band extend in the same general direction, there being no interweaving as in an ordinary fabric band. A stretching action, therefore, and due to the further fact that the fabric is cut on the bias at practically an angle of forty degrees, will allow the cord fabric to stretch, or in other words, cause the tangential strands to align themselves perfectly with relation to each other.

The stretching action applied to each band should occur when the band is in its circular form, and the area of contact of the stretching means should conform to the area of the crown of the finished tire. The stretching action, therefore, should be centrally of the circular band and radially from the central axis.

Another object, therefore, of the present machine, is to provide a means whereby the bands of the cord fabric may be first stretched in a uniform economical and mechanical manner which will then permit the stretching down of the cord fabric over the wood, metal or pneumatic core and formed in the regular manner. This first action causes the cord fabric to be so stretched that the cords which are, as is well known, impregnated, with a small amount of rubber, to be in perfect alignment, thus assuring straight cords and an unwrinkled carcass.

Still another object of the invention is to facilitate the stretching of the fabric cords to a correct angle, tangent with the wheel or center of the tire, which condition is made possible by cutting the fabric on an angle (previous to being applied to this expanding machine) commensurate with the percentage of stretch obtained by the expanding machine.

Still another object of the machine is to provide means whereby several layers of cord fabric may be applied to the machine and all the plies or bands expanded a desired degree so that the several layers, the cords of which, of course, extend at angles to each other, are all stretched the desired amount and assume the correct position; stretching out all the wrinkles so that when the fabric is applied to the tire building machine it will have been centrally stretched to a degree which would not be possible if simply placed on the cord tire building machine.

Still another object of the machine is to provide means whereby the band or bands may be stretched any desired amount, though I have found in practice that the ten percent stretch is the most desirable.

Still another object of the invention is to provide means whereby the machine may be regulated before the stretching starts, so that when the bands are applied, they will be stretched, say ten percent after which time the stretching action will automatically cease and the peripheral shoes may be returned to their original position by simply reversing the motor of the machine.

Still another object of the invention is to provide an expanding machine consisting of a plurality of peripheral shoes which are designed to move radially from a central shaft, wherein the amount of travel of the shoes may be automatically regulated; at the same time provide means whereby these radially expanding shoes may be, by simply disengaging a clutch, revolved slowly by hand so that the band may be placed correctly and centered upon the radial shoes.

Still another object of the invention is to provide means for stretching the cord fabric bands which are used to build up the carcass of the tire to any degree desired, and to provide means whereby the band may be easily and correctly placed upon the machine, after which the band, or bands, may be expanded, and the whole cycle taking approximately seven seconds, although the stretching action may be halted at any point and the bands left on a greater length of time, if so desired.

Still another object of the invention is to provide a tire band expanding machine which makes it possible to build the larger size cord tires wherein no wrinkles will be found in the bands when applied to the tire building machine, and wherein the amount of stretching may be quickly predetermined so that the machine will be automatic in its operation.

Still another object of the invention is to provide a machine that is simple in operation, relatively cheap to construct and highly efficient and speedy in action.

With these and other objects in view, the invention consists in certain new and novel features of construction and combination of parts as will be hereinafter more fully described and pointed out in the claims.

Referring now to the drawings showing a preferred embodiment of my invention,

Figure 2:
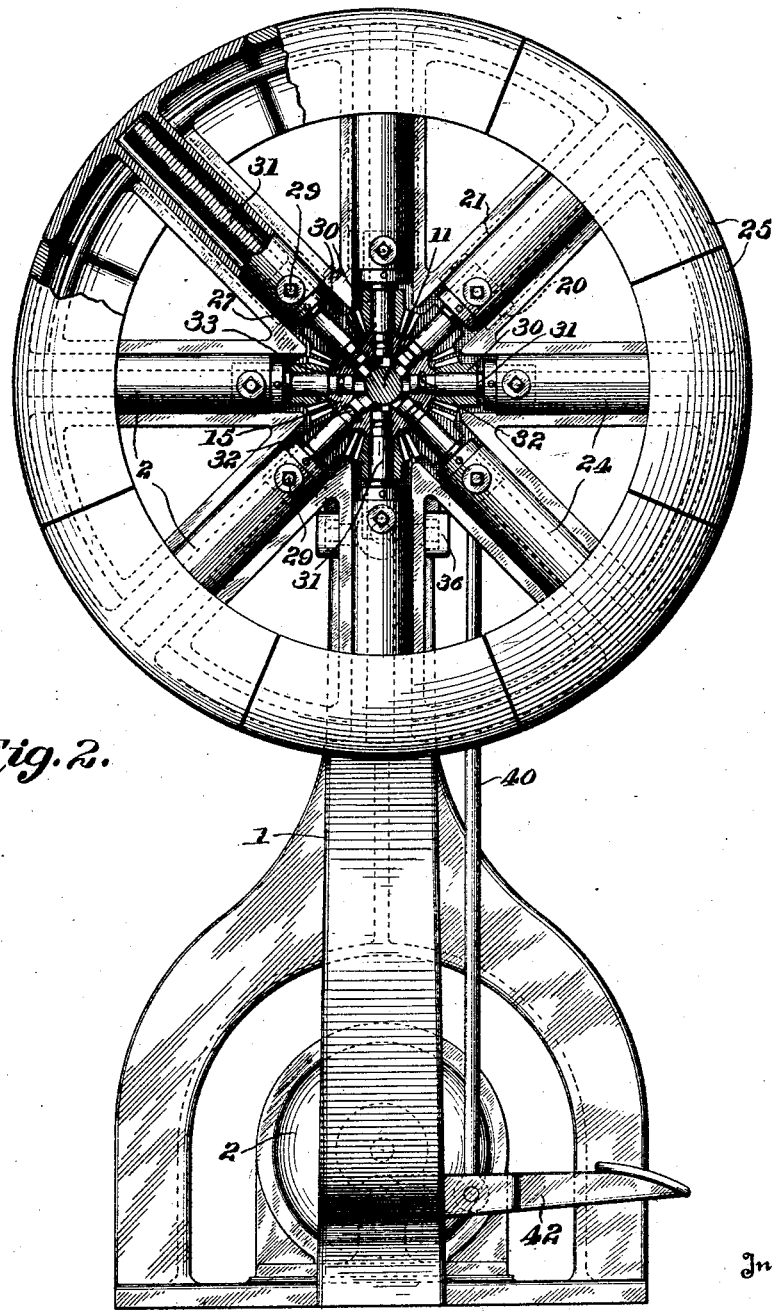
Fig. 2 is a front view of the machine, parts being broken away for the sake of clearness, a central portion being shown in section and the shoes in their normal position.

Fig. 2ᵃ is a similar view, the shoes, however, being in their expanded position;

Fig. 3 is an enlarged view of the automatic stop mechanism taken on line 3—3 of Fig. 4;

Fig. 4 is a face view similar to Fig. 3, of the switch, or automatic stop mechanism;

Fig. 5 is an enlarged side view of the same, partly in section, and parts being removed for the sake of clearness;

Fig. 6 is a detailed sectional view of one of the peripheral shoes and its guide;

Fig. 7 is a sectional view taken on line 7—7 of Fig. 6; and

Fig. 8 is a fragmentary perspective of the lower portion of the shank of the shoe.

Figure 1:
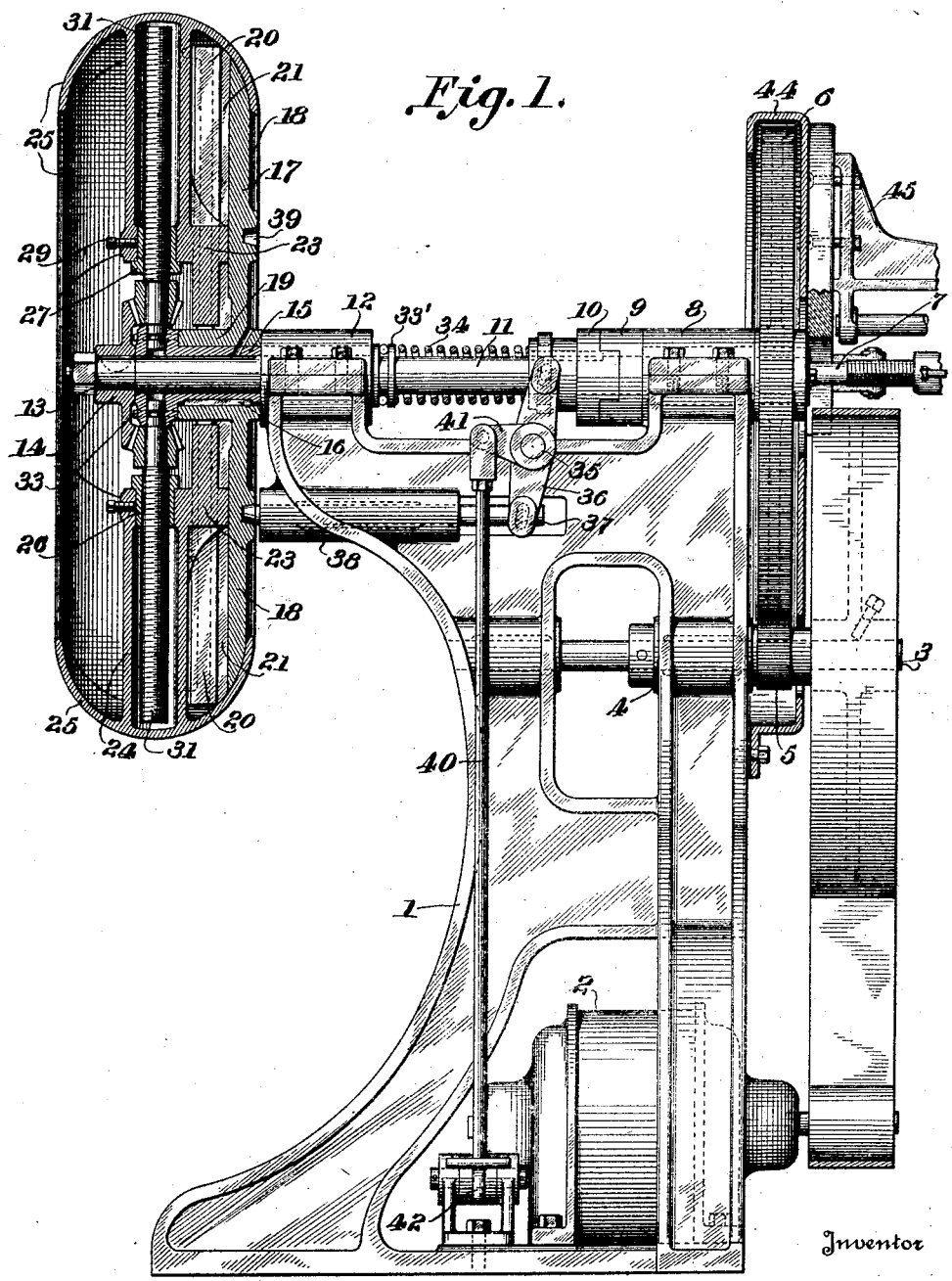
Fig. 1 is a side elevation, some of the expanding shoes and their cooperating mechanism being shown in section.

Referring now more specifically to the drawings, and to Fig. 1 in particular, there is shown a standard or base 1, in which there is housed an electric motor 2, designed to drive the shaft 3, which is suitably mounted in the bearings 4 located near the upper portion of the base or standard 1. On this shaft 3 is the pinion 5, which in turn, drives the large gear 6 mounted on the shaft 7, the shaft being mounted in a suitable bearing 8 and provided with one portion of the face clutch 9. The other portion 10 of the clutch is mounted on a main drive shaft 11 which is supported in the bearing 12 and extends outwardly to the point 13, and locked thereon is the beveled gear 14. On this shaft 11 and just beyond the bearing 12, is the hub 15, as may be clearly seen in Fig. 1, which is keyed as at 16 to a spider 17. This spider 17, as may be seen both in Figs. 1 and 2, consists of the rear plate 18 and the integral hub 19, the latter keyed, as previously mentioned, to the hub 15. This rear plate 18 has the radially extending passageways 20 which are provided with slots 21 along their length to receive lugs 22 formed on guides 23, the guides formed integrally with the shank 24 of each of the radial shoes 25.

Inasmuch as the shoes are similar and interchangeable, a description of the one will be a description of them all.

I have found by numerous tests, that eight peripheral shoes are the most practical arrangement, although a lesser or greater number of shoes of greater or lesser proportional length may be used, if desired.

I have also found that aluminum shoes are more practical than shoes formed of wood, iron, steel or brass, as the rubberized surfaces of the cord fabric have less tendency to adhere to the aluminum shoes than to those formed of either metal or wood.

The outer configuration of the shoe is substantially U-shaped, or in other words, conforms approximately to the tread or crown of the tire building core. They may, of course, be of different cross-sectional dimensions, depending on the size of the tire to be built, the large six, seven and eight inch tires call for shoes of larger cross-sectional dimension to stretch the fabric, while the bands of the three and one-half and four inch tires would be stretched on shoes of much smaller cross-sectional dimensions.

The lower end of the shank 24 receives an internal collar or hub 26 having an annular ring 27 thereon, the hub being internally threaded as at 28, while a set screw 29 is shown passing through the shank 24 so that the hub may be locked at the desired point in the end of the shank.

Referring now to Fig. 2, it will be seen that these radial passageways 20 of the spider terminate at a short distance from the center shaft 11 so that a plurality of pinions 30 may be placed at the entrance of each passageway which pinions are respectively secured to the threaded shafts 31, which shafts engage the internally threaded hubs 26, so that a movement in one direction of the shaft 11 through the bevel gear 14 will cause the pinions 30 to revolve and force the radial shoes outwardly, while a movement in the opposite direction of the shaft 11 will likewise cause the shoes to move inwardly. The heretofore mentioned collar 15 is provided with radially extending openings for the reception of the inner ends of these threaded shafts 31, as may be seen in Fig. 2, and these threaded shafts are each provided with an annular depression or ring 32 so that a small pin 33 may be passed through the hub 15 and engage the ring 32 so that these threaded shafts and shoes cannot drop or become disengaged from their relative position.

To reiterate, a movement of the central shaft 11 through the rotation of the beveled gear 14 will cause the shoes to travel outwardly, the lugs 22 being guided in the slots 21 formed along the side of the radial passageways 20, and a reverse movement of the shaft will cause them to move inwardly to their normal position.

Referring again to Fig. 1, there will be noticed a collar 33' located on the shaft 11 and a spring 34 extending between this collar and the face portion 10 of the clutch. Pivoted to the base of the machine, as at 35, is the crank arm 36 which is pinned at its upper end to the hub of the portion 10 of the clutch and at its lower end operably connected to the pin 37 which pin passes through a bearing 38 and is adapted to project into one of a series of holes 39. To operate this crank arm 36 and the pin 37, there is shown the rod 40 to the lower end of which is secured the foot pedal 42, while the upper end of this rod 40 is connected to the small arm 41 which may be secured on the shaft 35 and locked to the crank 36. A movement of this foot pedal 42 will disengage the clutch faces 9 and 10 and will withdraw the pin 37 from one of the holes 39. It will be now possible to revolve the spider and the peripheral shoes by hand, and as the holes 39 are spaced in a circle, but at some distance from each other, the spider and peripheral shoes may be turned for a part of a revolution, it being impossible for the clutch to return to engaging position even though the foot is removed from the pedal as the pin 37 will hold the lower portion of the crank arm from moving inwardly. Should it be desired to turn the spider and shoes a greater extent, it is simply necessary to hold the foot on the pedal when the wheel may be again turned for a portion of a revolution or until the pin 37 registers with the hole 39. By using this form of construction, the machine is disengaged from operation until both the clutch and the foot pedal are properly connected.

It is often desired to rotate these shoes by hand, as when applying the bands of fabric, it is easier to apply the bands, say to the top portion of the wheel (formed by the peripheral shoes) and then rotate the wheel a short distance by hand, rather than have the operator stoop over and try to slip and center the band over the wheel near the bottom thereof.

As far as the specification has proceeded, therefore, it will be readily understood that after the band or bands are applied and centered, and the motor 2 set into operation, the drive shaft 11 will, through the bevel gear 14 and the plurality of pinions 30, cause the shoes to all move outwardly, and that a reverse movement of the motor will cause the shoes to return to their normal position, as shown in Figs. 1 and 2.

Referring now to the means employed for determining the amount that the shoes will travel or expand in a radial direction, and glancing first at Fig. 4, there is seen a plate 43 which may be of fibre or other good dielectric which is placed adjacent to the guard 44 encircling the gear 6. Extending from this plate is the bracket 45 in which is secured the track or guide rod 46 and on which is mounted the carriage 47, the latter being internally threaded to receive the threaded drive shaft 48, which shaft, at its inner end, is locked to the shaft 7, heretofore mentioned, suitable bearing being provided, as shown in the several figures.

Electrical contact posts 49 and 50 are shown mounted in the fibre plate 43; the proper electrical connections for the post 49 being made through the terminals 51 so that the electrical contact may be broken at this post 49 when the carriage 47 has reached its innermost travel, and thereby stop the motor, and of course, the movement of the shoes, as will be more fully explained as the specification proceeds. In the same manner, the terminals 52 are shown for the proper electrical connection with the post 50 forming a circuit which will be broken when the carriage has reached a predetermined position during its outward movement, and the peripheral shoes have been forced outwardly the desired amount.

A rheostat, of course, will be employed, and means for reversing the motor, but any form of general electrical practice can be used with this switch.

Referring further to the automatic switch and to Fig. 3 in particular, there is shown an irregularly shaped arm 53 which is pivotally mounted on the plate 43, this arm having a contacting surface 54 at one end which normally contacts with the post 50, while the other end of the arm has an opening 55 therein to partly encircle the rod 56 which in turn is secured to one of two ears 63 of the carriage 47. On this rod 56 is mounted a slidable stop 57 which may be locked at any desired position along the rod 56.

It is to be remembered that the shaft 48 is practically a continuation of the shaft 7 so that a revolving of the shaft 7, 11, and the bevel gear 14, together with the pinions 30 and the radial shafts 31 are all proportional and the travel of the carriage 47 will be proportional to the travel of the radial shoes. Therefore, by setting the stop 57 at any predetermined point along the rod 56, when the carriage moves outwardly by the rotation of the shaft 48 and the stop hits the breaker arm 53, the latter will be forced outwardly and break the contact at 54, thereby causing the motor to stop and likewise stop the radial shoes in their outward movement. In a like manner, to stop the inward travel of the shoes, after the motor is reversed, there is a breaker arm 58 which is likewise pivoted to the plate 43, and has the contacting face 59 located at its one end, while its opposite end is secured to the rod 60, this rod being threaded and provided with a set nut 61 and a lock nut 62.

The rod 60 passes through the other ear 63 of the carriage and when the carriage has reached its innermost point of travel, this ear contacts with the lock nut 62, forcing the breaker arm inwardly at its one end and outwardly at its opposite end, thereby breaking the electrical contact between the post 49 and the contact surface 59 of the breaker arm, thus cutting off the motor and stopping the machine.

The lock nuts 61 and 62 after once being set will not have to be changed, whereas, the stop 57 may be changed at any time desired, so that the cord fabric may be stretched five percent, ten percent, or in fact, to any percentage desired. As a rule, however, it will be set in one position, and the machine run at this setting until different size tires are to be built on the machine.

The operation of the machine is therefore as follows:—

The cord fabric band whose ends have been lapped or butted is placed centrally upon the wheel formed of the peripheral shoes and is properly centered, the edges of the band hanging down below the sides of the shoes. The pedal 42 is pressed, if it is desired to disengage the clutch faces 9 and 10 so that the wheel, as a whole, may be revolved, the pushing of the foot pedal also retracting the pin 37, as will be remembered. After the band is properly placed about the shoes and properly centered, the motor 2 is started, which, through the gears 5 and 6 revolve the shafts 7 and 11, and also the shaft 48 (which is secured to the shaft 7) and the bevel gear 14, secured to the shaft 11 drives the pinions 30, which in turn, revolve the shafts 31, thereby driving the radial shoes outwardly. The circuit connection for the motor in this instance, will be through the post 50, so that the switch arm 53 will be operated after the carriage 47 has travelled on the shaft 48, and the stop 57 contacts with the breaker arm 55. When this point is reached, the electrical contact being broken, the motor will stop, and due to the gearing and other factors, the radial shoes will stop in their outward movement nearly instantly.

The band may be left in this stretched position, for a few moments, if desired, and the electric switch (not shown) then thrown so that the motor will be reversed and the circuit passing through the electrical post 49. The shafts 7, 11 and 48 are now turning in the opposite direction, and likewise the bevel gear 14, so that the peripheral shoes will be shortly returned to their normal position, and the carriage 47 travelling inwardly will, at the inner end of its travel, cause the ear 63 to strike the lock nut 62 and move the breaker arm, break the contact at 59 and stop the motor, the shoes having then returned to their normal position.

The whole operation of moving the shoes, expanding the cord fabric centrally and circumferentially, and returning the shoes to their normal position, takes less than seven seconds.

One band may be stretched at a time, or a plurality of bands, and if a plurality of bands are stretched at the one time, they will be inverted with respect to each other, so that the cords extend at an angle to each other, as is the practice in making cord tires.

The bands are now stretched so that the respective cords of each band will be parallel to each other, or in other words, be taut and free from wrinkles. The bands may be applied to a regular tire making machine to make up a smooth carcass, wherein the plies will be free from wrinkles, or applied to a hand building tire stand.

It will be appreciated that this machine is to be used wherein the bands are made of "cord fabric".

From the foregoing, it will be seen that I have invented a machine wherein the cord fabric may be first properly stretched to free it from wrinkles, one or a number of plies being stretched at the same time, after which the plies may be placed on the regular tire building machine and the carcass of the tire then built up, the plies being free from wrinkles.

It will be also seen that I have invented a machine wherein the work may be done rapidly, the composite rim formed of the peripheral shoes being easily turned by hand if so desired, so that the band or bands may be quickly applied and centered; wherein the bands may be expanded any predetermined or desired amount; wherein the expanding action or travel of the shoes will automatically stop, and wherein by reversing the motor, the peripheral shoes will return to their normal position, after which the cycle may be again started.

The machine is relatively simple in construction, has proved highly efficient in action, and makes it possible to build the large size tires. The carcass will be free from wrinkles, which has not been possible heretofore when the bands were simply placed on the ordinary tire machine without a preliminary stretching.

Many slight changes might be made in the construction and details of the machine without in any way departing from the spirit and scope of the invention.

Having thus described my invention, what I claim as new and desire to secure by Letters Patent is:—

1. A tire band expanding machine comprising a base, a main shaft mounted on said base, a support mounted at the outer end of said shaft and provided with radial passageways therein, a plurality of segmental shoes having hollow shanks, guide members formed on the ends of said shank and fitting within said radial passageways, internal threaded means slidably fitting within the lower end of said shank, and means for holding the same against rotation and radially extending means cooperating with said shaft and said internal threaded means in said shank for expanding and contracting said shoes.

2. A tire band expanding machine comprising a base, a main shaft mounted on said base, a support mounted on the outer end of said shaft and provided with radial passageways therein, a plurality of segmental shoes having hollow shanks and integral guide members on said shanks having lugs thereon for fitting within said radial passageways, a threaded collar slidably fitting within said shanks, and means for locking the same in a predetermined position, and a plurality of radial means for respectively engaging said threaded collars, and to be driven by said shaft to thereby expand and retract said shoes.

3. A tire band expanding machine comprising in part a plurality of segmental shoes, each shoe being substantially U-shape and having a hollow shank extending therefrom, the end of said shank having a guide member with projecting lugs thereon formed integral with the shank, an internally threaded collar slidably fitting within said hollow shank and means for locking the collar at a predetermined point in the shank.

4. A tire band expanding machine comprising a base, a stub shaft mounted on said base and provided with a clutch face, a driven shaft mounted in said base and provided with a cooperating clutch face, a support mounted at the outer end of said driven shaft and provided with radial passageways therein, a plurality of peripheral shoes slidably supported in said passageways, means cooperating with said driven shaft and said shoes for radially expanding said shoes when said stub and driven shafts are in their cooperating position, means for driving said stub shaft, means for disengaging said clutch so that said support and said peripheral shoes can be moved circumferentially.

5. A tire band expanding machine comprising a base, a shaft and stub shaft mounted in said base having a clutch interposed between the same, a guiding support mounted on the outer end of said shaft and a plurality of peripheral shoes slidably mounted in said support, means cooperating with said shaft and said shoes for radially moving said shoes, means for driving said shaft, means for limiting the radial expansion of said shoes, said means secured to said stub shaft, and means for disengaging said clutch to thereby allow a manual circumferential movement of said support and said shoes.

6. A tire band expanding machine comprising a base, a stub shaft mounted on said base and provided with a clutch face thereon, a main shaft mounted in said base and having a clutch face cooperating with said first mentioned clutch face, a support mounted at the outer end of the main drive shaft provided with radial passageways therein, a plurality of peripheral shoes slidably supported in said passageways, means cooperating with said main drive shaft and said shoes for radially expanding said shoes when the clutch faces are in their locked position, means for driving said stub shaft, means for disengaging said clutch, and means connected to said disengaging means for locking said support and said shoes against circumferential movement when said clutch faces are locked, and said locking means disengaging when the clutch faces are separated to allow the shoes and support to be manually revolved.

7. A tire band expanding machine comprising a base, a shaft mounted on said base, means for driving said shaft, a support mounted on the outer end of said shaft capable of a rotatable movement, a plurality of expanding shoes slidably mounted in said support, means cooperating with the shoes and said shaft for radially moving said shoes when said shaft is revolved, and means for locking said support against rotation when the said shoes are being radially moved.

8. A tire band expanding machine comprising a base, a shaft mounted on said base, means for driving said shaft, a support mounted on the outer end of said shaft capable of a rotatable movement, a plurality of expanding shoes slidably mounted in said support, means cooperating with the shoes and said shaft for radially moving said shoes when said shaft is revolved, means for locking said support against rotation when said shoes are being radially moved, and means for automatically variably limiting the amount of expansion of said shoes.

9. A tire band expanding machine comprising a base, a shaft mounted on said base, means for driving said shaft, a guidable support mounted on said shaft, a plurality of peripheral shoes mounted in said support, means cooperating with the shoes and the shaft for expanding and retracting said shoes depending on the direction of movement of said shaft, means for automatically predetermining the limit of expansion of said shoes, and said shoes and support locked against rotation when said peripheral shoes are expanding or retracting.

10. A tire band expanding machine comprising a base, a shaft mounted in said base, driving mechanism for said shaft, a rotatably mounted support on the outer end of said shaft, a plurality of peripheral shoes slidably mounted in said support, means cooperating with said shaft and said shoes for expanding and retracting the same depending upon the direction of movement of said shaft, means for automatically limiting the inward and outward movement of said shoes, said rotatable support normally locked against rotation, and means for disengaging the driving mechanism from said shaft and simultaneously unlocking the support for said shoes so that said shoes and said support may be manually rotated.

11. A tire band expanding machine comprising a base, a shaft mounted in said base, a support in the form of a spider having radially extending passageways therein, said support mounted on said shaft, a plurality of peripheral shoes each having a shank and guide member formed on the outer end of the shank, an adjustable internally threaded collar fitting within said shank, said guide member slidably fitting within a radial passageway of said support, radially extending shafts fitting within said shanks in threaded relation with said collar, pinions mounted on the ends of said radially extending shaft and a beveled gear secured to the main shaft for driving said radially extending shafts to thereby expand and retract said shoes, and means driven along one end of said shaft for automatically limiting the amount of radial expansion of said shoes.

12. A tire band expanding machine comprising a base, a shaft mounted in said base and a guidable support locked to said shaft near one end, a clutch mounted at the other end thereof, driving means cooperating with said clutch, said support provided with a plurality of radially extending passageways, a plurality of peripheral shoes having shanks formed therewith, the ends of the shanks having integral guide lugs formed thereon to fit slidingly within said radial passageways, an internal threaded collar in each of said shanks, a plurality of radially extending external threaded shafts fitting respectively within the collars in said shanks, a beveled gear secured to said shaft, each of the threaded shafts having a pinion thereon meshing with said beveled gear, means for disengaging the clutch from the driving mechanism, so that said support and shoes may be manually rotated, and means for limiting the amount of radial travel of the shoes in an outward direction.

13. A tire band expanding machine comprising a base, a shaft mounted in said base, and a guidable support locked to said shaft near one end, a clutch mounted at the other end thereof, driving means cooperating with said clutch, said support provided with a plurality of radially extending passageways, a plurality of peripheral shoes having shanks formed therewith, the ends of the shanks having integral guide lugs formed thereon to fit slidingly within said radial passageways, an internal threaded collar in each of said shanks, a plurality of radially extending external threaded shafts fitting respectively within the collars in said shanks, a beveled gear secured to said shaft, each of the threaded shafts having a pinion thereon meshing with said beveled gear, means for disengaging the clutch from the driving mechanism, so that said support and shoes may be manually rotated and means for predetermining the amount of inward and outward radial travel of the shoes.

14. A tire band expanding machine comprising in part, a rim made up of segmental metal shoes substantially U-shaped in cross section, each of said shoes provided with a hollow shank on which shank is formed a guide member, an internal threaded member slidingly fitting within said shank and means for adjustably locking said internally threaded member and adapted to receive a threaded shaft to drive said shoe outwardly and return the shoe to its normal position.

15. A tire band expanding machine comprising in part a rim made up of segmental shoes, each of said shoes being substantially U-shaped in cross section and provided with an integral hollow shank having a guide member formed integrally therewith near its outer end, an internal threaded portion at the outer end of said shank, and means for adjustably locking the internal threaded portion in the outer end of said shank, a plurality of radially extending threaded shafts to respectively engage the threaded portion of the shanks of the shoes, a central shaft having a beveled gear thereon, pinions on each of said radially extending shafts to be driven by said beveled gear, a spider having passageways for the reception of the guiding members on the shanks of each of the shoes, and means for rotating said central shaft to thereby radially move the segmental shoes.

16. A tire band expanding machine comprising in part a wheel made up of segmental shoes, each of said shoes being substantially U-shaped in cross section and provided with an integral hollow shank having a guide member formed integrally therewith near its outer end, an internal threaded collar slidably fitting within the outer end of each of said shanks and means for locking it within said shanks for the purpose of fine adjustment, a central shaft provided with a beveled gear and a plurality of radially extending threaded collars in said shanks, a guiding support secured to said central shaft and provided with a plurality of passageways for receiving and guiding the shanks of the segmental shoes when said central shaft is driven and said shoes are forced inwardly and outwardly, and means connected to said shaft for variably limiting the distance the shoes travel from said central shaft.

17. A tire band expanding machine comprising a base, a main shaft mounted on said base, a plurality of radially extending threaded shafts driven by said main shaft, a plurality of peripheral shoes co-acting with said radially extending shafts so that the said shoes will be driven inwardly or outwardly depending upon the direction of rotation of said first mentioned shaft, a stop mechanism for limiting the outward movement of said shoes comprising a shaft threaded with relation to the radially threaded shafts, a carriage on the threaded shaft of the stop mechanism, and a breaker arm electrically connected with a motor for driving said main shaft, and said carriage adapted to move said breaker arm at any desired point to thereby stop the driving of the main shaft and limit the radial movement of the shoes.

18. A tire band expanding machine comprising a base, a main shaft, a motor for driving said shaft, a rim made up of a plurality of peripheral shoes, threaded radially extending shafts cooperating with said main shaft and said shoes for forcing said shoes inwardly and outwardly when said main shaft in rotated, an automatic stop comprising a threaded shaft secured to the said main shaft, a carriage engaging said threaded shaft and travelling inwardly and outwardly on said shaft, and the movement of the carriage being proportional to the movement of the shoes, breaker arms electrically connected to the motor and within the path of travel of said carriage, adjustable means between the breaker arms and the carriage whereby one of the breaker arms will be broken at a predetermined point on the outward movement of the carriage and shoes and the other breaker arm will be broken when the shoes have returned to their normal position.

19. A tire band expanding machine comprising a base, a main shaft, a motor for driving said shaft, a rim made up of a plurality of peripheral shoes, threaded radially extending shafts, cooperating with said main shaft and said shoes for driving said shoes inwardly and outwardly when said main shaft is rotated, a threaded shaft connected to one end of the main shaft and a carriage in threaded relation therewith adapted to travel proportionally outwardly when the radial shoes are forced outwardly, two breaker arms electrically connected with the motor, the carriage provided with two oppositely arranged ears, a rod secured in one of said ears, a slidable stop on said rod, adapted to be locked in a desired position, said stop contacting with one of said breaker arms when the said carriage and said shoes have travelled outwardly to a predetermined position to thereby break the electrical contact and stop the shoes in their outward movement, means on said other breaker arm to contact with said carriage to break the electric contact when the shoes have returned to their normal position.

20. A tire band expanding machine comprising a main shaft, a plurality of peripheral shoes, a plurality of radially extending threaded shafts cooperating with said shoes and said main shaft to force said shoes inwardly and outwardly when said main shaft is rotated, an electrical motor for driving said main shaft, a relatively short threaded shaft connected to an end of said main shaft, a threaded carriage designed to travel inwardly and outwardly on said last mentioned shaft, the travel of the said carriage being proportional to the travel of said shoes, electrical breaker arms connected to the motor and extending within the path of travel of said carriage, means interposed between the breaker arms and said carriage for predetermining the amount of travel of the carriage in each direction before contacting with the breaker arm, and a tripping of one breaker arm limiting the outward movement of the travel of the carriage and the outward travel of the shoes and the tripping of the opposite breaker arm limiting the inward amount of travel of the carriage and the shoes.

In testimony whereof I affix my signature.

HARLEY P. MURRAY.